June 14, 1960     H. FEHLING     2,941,122
HIGH SPEED ELECTROMAGNETIC ELECTRORESPONSIVE DEVICE
Filed March 12, 1957

Inventor:
HEINZ FEHLING

By Taulmin & Taulmin

Attorneys

United States Patent Office 2,941,122
Patented June 14, 1960

2,941,122

HIGH SPEED ELECTROMAGNETIC ELECTRO-RESPONSIVE DEVICE

Heinz Fehling, Neumunster, Holstein, Germany, assignor to Licentia Patent-Verwaltungs-G.m.b.H., Hamburg, Germany Filed Mar. 12, 1957, Ser. No. 645,431

Claims priority, application Germany Mar. 12, 1956

4 Claims. (Cl. 317—50)

This invention relates to high speed electroresponsive devices, and more particularly to high speed circuit breakers with automatic release. It relates still more particularly to such circuit breakers, whose tripping mechanism comprises an electromagnetic holding magnet system.

It is an object of my invention to provide an electroresponsive device of the aforesaid kind which is particularly safely responsive to faults, such as for example short circuits and back firing in the return columns, for instance of rectifier systems.

It is another object of my invention to provide for an improved high-speed electroresponsive device which is capable of responding within a few milliseconds to disturbances occuring in a high tension power system comprising several rectifier groups, and which is capable of quickly and safely cutting out that rectifier group in which the fault occurs.

It is a further object of the invention to provide a high-speed circuit breaker which comprises, apart from its automatic tripping system, additional safety means for releasing the breaker before the tripping system becomes operative.

In many high tension power systems, such as for instance industrial electrolysis plants operating with high working current intensities, a number of mercury vapor rectifiers may be arranged in several groups to feed in parallel direct current to the busbars of, for instance, a group of electrolytic cells. Protecting devices for the rectifiers are preferably used in the form of return current high-speed circuit breakers, which respond to a short circuit in one of the rectifier groups, or to back firing in the return current, and are capable of cutting off the input fed by the remaining rectifier, or to cut out the faulty group from the entire assembly.

High-speed circuit breakers serving for the aforesaid and other similar purposes, are usually provided with a holding magnet system of the type described, for instance, in the Swiss Patent 161,679 and U.S. Patent 2,188,803.

High-speed electroresponsive devices of this kind are usually sensitive to current rises, i.e. they respond dynamically before they respond statically. Due thereto, a time lag as high as several hundred milliseconds, may occur, before the final break in the current is made by the high-speed circuit breaker. Especially, if there is a flat, i.e. gradual decrease in the forward current circuit, or if uncontrollable phenomena occur on the rectifier side during a fault therein, which may last longer than is admissible, for the load capacity of a mercury rectifier, time lags of the aforesaid magnitude in the ultimate release of a circuit breaker due to failure in responding of the automatic tripping release of the breaker, may have very detrimental consequences.

It is known in the art to use return current high-speed relays on the cathode side of a rectifier or of a rectifier group, which relays are capable of making the grid gate of the system within about two to three milliseconds, whereupon a certain delay must be expected before the circuit breaker has completely broken the circuit.

However, in the case of a fault in a rectifier group it is absolutely desirable to cut off that group selectively and rapidly as the only means of avoiding serious disturbances in the operation of the plant.

For these and other purposes it is necessary to influence the holding magnet system of the high-speed circuit breaker by separately excited magnet fields in such a manner that the de-excitation of the magnet system and consequently the release of the circuit breaker to cut off the faulty group, can be effected at a time even before the automatic tripping mechanism of the breaker becomes responsive to the fault.

The aforesaid objects are obtained by my invention which provides for a high-speed electromagnetic electroresponsive device, in particular a high-speed circuit breaker, which comprises a holding magnet system and a novel extraneous quick release device to be used preferably as a return current high-speed circuit breaker having an automatic tripping mechanism in addition to the aforesaid extraneous quick release device.

It is a main feature of my invention that the holding magnet system of a high-speed circuit breaker is provided, in the conventional manner with an automatic tripping device, and, in addition thereto, with a novel extraneous quick release device which becomes operative in the time interval between an event requiring breaking of the circuit serviced by the breaker, and the instant at which the automatic tripping mechanism of the breaker becomes responsive.

According to another important feature of the invention the extraneous quick release device comprises a counter exciting coil arranged on the armature of the holding magnet system, which counter excitation coil can be influenced by an extraneous pulse so as to produce a flux in the magnet system which opposes the holding flux prevailing under normal operation in the electromagnetic holding system. The counter excitation coil, or counter flux coil, can be connected by flexible leads to the circuit for the extraneous pulse.

This arrangement of a counter flux coil excitable by an extraneous pulse on the armature of the holding magnet system offers unexpected advantages over the known arrangement and in particular over those described in the Swiss and United States patents supra in that the counter ampere windings are generated in this novel arrangement at the very place where they are most effective in releasing an armature and a breaker latch connected thereto from holding magnet. The effectiveness of this arrangement for the aforesaid purposes is further enhanced by the fact that, stray losses are avoided, so that the full counter flux produced in the counter flux coil is fully effective on the circuit breaker armature.

According to a further feature of the invention, the generation of the releasing pulse is effected with the aid of capacitor means which assist in producing the counter flux in the armature coil which is opposed to the holding flux of the magnet system. It is preferred to mount the counter flux coil on the armature of the holding flux system by embedding the same in castin resin surrounding the coil and armature so as to protect the coil against displacement relative to the armature by shocks and vibrations.

The extraneous quick release device in the arrangement according to the invention is preferably tripped by means of relay means which cause the aforesaid pulse to energize the counterflux coil on the armature of the holding system. The relay means, in the arrangement according to the invention comprise coil means which are arranged in the return current path of the main circuit to be protected.

These relay means for tripping the extraneous quick release device are energized for instance as soon as the forward current in the main circuit, for instance of one of the aforementioned rectifier groups, falls off.

The reverse-current relay means are preferably so arranged that they produce an extraneous pulse for energizing said counter flux coil, and concurrently therewith, interrupt the energizing circuit of the electromagnetic holding system. This measure provides for additional safety in ensuring an effective breaking of the main circuit, and further offers the advantage, that the counter ampere windings produced by the extraneous pulse in the holding magnet system have to oppose only an already attenuating holding flux.

The circuit breaking periods achieved with the arrangement according to the invention, if used in high-speed circuit breakers for, e.g., a rated current of 7500 amperes, amount to only a few milliseconds and are, therefore, much shorter than the tripping periods required in the known electroresponsive devices of this kind.

Since the deflection of the armature of the holding system, which bears the counter flux coil, does not exceed 20 millimeters in general, the counter flux coil may be connected to its pulse feeding circuit by means of flexible leads, without thereby causing a shorter lifetime of the device.

Additional objects and advantages will become apparent from the following detailed description of the accompanying drawings, wherein.

Figure 1:
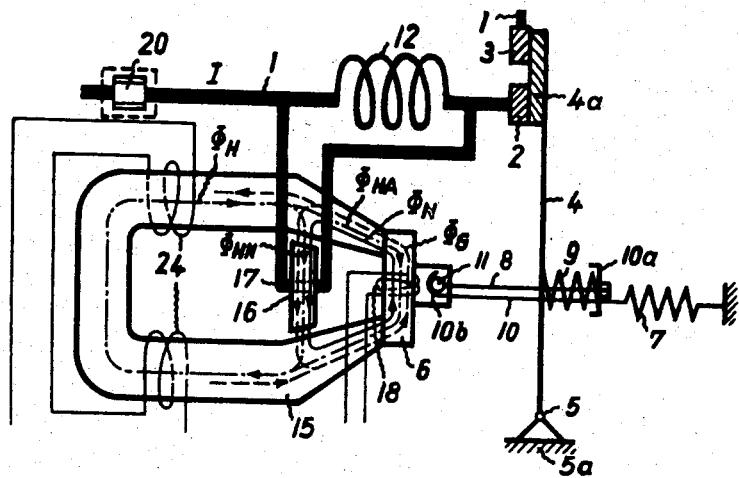
Figure 1 illustrates schematically a circuit breaker comprising the electroresponsive arrangement according to the invention.

The circuit breaker illustrated in Figure 1 is arranged in a main high tension power line 1, preferably of the return current flow, for instance of a rectifier group, and comprises the breaker contacts 2 and 3, which are bridged with the breaker in closed position, by the contactor end 4a of the contact arm 4. A spark quenching coil 12 is provided in the main line 1. The contactor arm 4 is pivotally mounted at 5 on a breaker base or frame 5a, and is held in closed position, with contactor end 4a bridging the gap between contacts 2 and 3, by an armature 6, forming part of the contactor holding system to be described hereinafter, and against the pull of a tension spring or similar resilient means 7. The armature 6 is mounted on an armature guide rod 8 and resiliently connected to the contactor arm 4 via damping spring 9 and a hook-shaped connecting latch 10, to the one end of which there is attached the tension spring 7, and the damping spring 9, while its other, hook-shaped end 10b grasps a pin 11 or the like rigidly fastened to armature 6.

The electromagnetic holding system of the circuit breaker comprises a holding magnet 15, the aforesaid armature 6, and a conventional tripping member such as a soft iron yoke 16. About the yoke 16, there is arranged tripping coil, preferably as a wire in the form of a hair pin winding 17, which is connected to the main line 1 in parallel with spark quenching coil 12. The armature 6 of the holding system bears a counter flux coil 18, which is energized by pulses produced in the wiring system shown in Figure 2. In the main line 1, there is further arranged the energizable member of a high-speed relay 20, the armature 21 of which is operable as a make contact in the pulse feeding circuit of counter flux coil 18, shown in Figure 2.

This circuit comprises, apart from the aforesaid coil 18, a capacitance 22 connected in parallel to coil 18, and having a magnitude of at least 600 to 800 F. This capacitor is charged from a direct current source 23, which serves at the same time as a current source for energizing the normal magnet flow coil 24 arranged about the rearward portions of the legs of holding magnet 15.

A protective resistance 25 is connected in parallel across the ends of coil means 24 and a resistor 26 is connected in series therewith.

A high-ohmic resistor 27 is connected in series with the pulse generating capacitance 22 and with counter flux coil 18, and serves for concentrating the releasing pulse in the discharge circuit via coil 18. The discharge circuit is closed by means of relay armature 21 whenever high-speed relay 20 responds to a fault in the main line 1.

The arrangement according to the invention operates in the following manner. Under normal operating conditions, coil means 24 generate a forward magnetic flux $\Phi_H$ in the magnet 15 which is the holding flux holding armature 6 in position, and consequently maintaining the main line circuit breaker closed. While this total flux $\Phi_H$ is maintained in the rearward portion of magnet 15, and about the end away from armature 6, the flux in the forward portion of the magnet close to the armature is divided into two fluxes $\Phi_{HA}$ and $\Phi_{HN}$, of which flux $\Phi_{HA}$ passing through the armature 6 is the greater, while flux $\Phi_{HN}$ passing through the yoke 16 is the smaller flux, since the air gaps between yoke 16 and magnet 15 is much greater than the air gap between the leg ends of the magnet 15 and the armature 6, while the latter is attracted by the magnet. Therefore, the holding force of the magnet on the armature 6 is only negligibly influenced by the deviation of flux $\Phi_{HN}$ through yoke 16. Now, if current flow increases through the pin wire lead 17 about the yoke 16, as, for instance, due to a short circuit in the main line 1, a flux $\Phi_N$ directed oppositely to flux $\Phi_{HN}$ is generated in the yoke 16, which counter flux $\Phi_N$ weakens the flux $\Phi_H$ and, after a certain time lag, permits spring 7 to pull armature 6 away from the holding magnet 15, thereby pivoting contactor arm 4 about 5 and opening contactor means 2, 3 and 4a, which leads to interruption of power flow through main line 1.

Depending upon the increment $di/dt$ of the change in current intensity, the current through lead 17 will sooner or later produce in yoke 16 a sufficiently strong counterflow for tripping armature 6. In this arrangement, the circuit breaker is susceptible to current increases and therefore fully polarized.

In the arrangement according to the invention, a short circuit or the like fault in the main line 1 causes, even prior to the response of tripping coil and armature arrangement 17, 16, 6, a release of armature 6 by causing relay 20 to respond to the current drop in line 1, thereby actuating relay armature 21, and producing a pulse from capacitance 22 through counter flux coil 18, which generates a counter flux $\Phi_G$ counteracting the holding flux through armature 6.

Figure 3:
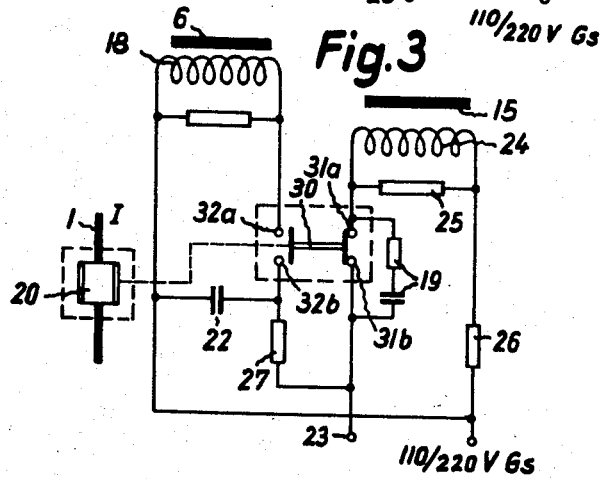
Figure 3 shows another wiring diagram of the arrangement according to the invention.

Figure 3 illustrates a slightly different wiring diagram in which high-speed relay 20 in line 1 energizes a relay armature 30, which, in normal operating position closes the holding flux generating coil means 24 on holding magnet 15, while, when relay 20 responds to a fault in line 1, the armature 30 moves to break contact between contact terminals 31a and 31b, thereby interrupting the holding current, and makes contact between terminals 32a and 32b, thereby producing a pulse that energizes coil 18 and releases armature 6 in the manner described above.

In order to make the arc formed at the relay contact when the armature thereof responds, as small as possible, and in view of the fact that a relative high inductivity must be cut off, a special arc killing circuit 19 comprising a capacitance and a resistance may be provided in parallel to the contact terminal line 31a—31b.

Figure 2:
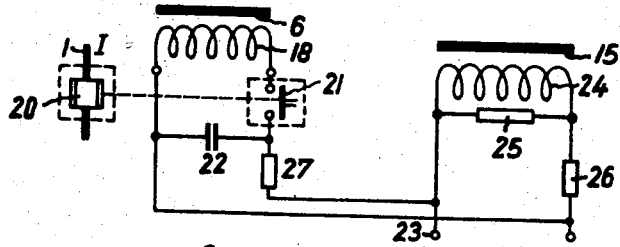
Figure 2 illustrates a wiring diagram of an electroresponsive arrangement according to the invention.

As shown in Figures 2 and 3, the same direct current source being a conventional power source of 110 or 220 volts or the like, may be used for feeding the energizing circuit of the holding system as well as the pulse producing circuit. And in the preferred type of the arrangement, energization of the pulse producing circuit will be automatically accompanied by breaking of the holding circuit.

It will be understood that this invention is susceptible to modification in order to adapt it to different usages and conditions, and, accordingly, it is desired to comprehend such modifications within this invention as may fall within the scope of the appended claims.

What is claimed is:

1. A high-speed circuit breaker for a high-tension line, comprising, in combination, switch means connected in circuit with said high-tension line and movable between open and closed positions, said switch means being continuously urged to its open position; electromagnetic holding means for holding said switch means in its closed position against the force which continuously urges said switch means to its open position, said holding means including a core having two pole portions, an armature connected to said switch means and in contact with said pole portions of said core when said switch means is being held in its closed position, and energizing means for inducing a magnetic flux in a magnetic circuit constituted by said core and said armature; first counter-energizing means operatively associated with said core for inducing, in response to an overload in the high-tension line, in at least that part of said magnetic circuit which includes said pole portions of said core and said armature a counter magnetic flux opposite to that induced by said energizing means; and second counter-energizing means operatively associated with said armature for inducing therein, in response to backfiring in the high-tension line, a magnetic counter flux which is also opposite to that induced by said energizing means, said second counter-energizing means responding to the backfiring more quickly than said first counter-energizing means, whereby said magnetic counter flux is induced by said second counter-energizing means at the place where said armature contacts both of said pole portions of said core, thereby avoiding stray losses.

2. A high-speed circuit breaker for a high-tension line, comprising, in combination, switch means connected in circuit with said high-tension line and movable between open and closed positions; spring means for continuously urging said switch means to its open position; electromagnetic holding means for holding said switch means in its closed position against the action of said spring means, said holding means including a core having two pole portions, an armature connected to said switch means and in contact with said pole portions of said core when said switch means is being held in its closed position, and coil means for inducing a magnetic flux in the magnetic circuit constituted by said core and said armature; first counter-coil means operatively associated with said core for inducing, in response to an overload in the high-tension line, in at least that part of said magnetic circuit which includes said pole portions of said core and said armature a counter magnetic flux opposite to that induced by said coil means; and second counter-coil means wound about said armature for inducing therein, in response to backfiring in the high-tension line, a magnetic counter flux which is also opposite to that induced by said coil means, said second counter coil means responding to the backfiring more quickly than said first counter-coil means, whereby said magnetic counter flux is induced by said second counter-coil means at the place where said armature contacts both of said pole portions of said core, thereby avoiding stray losses.

3. A high-speed circuit breaker for a high-tension line, comprising, in combination, switch means connected in circuit with said high-tension line and movable between open and closed positions; spring means for continuously urging said switch means to its open position; electromagnetic holding means for holding said switch means in its closed position against the action of said spring means, said holding means including a core having two pole portions and a high-reluctance yoke portion, an armature connected to said switch means and in contact with said pole portions of said core when said switch means is being held in its closed position, and coil means wound about said core for inducing a magnetic flux in the magnetic circuit constituted by said core and said armature; first counter-coil means wound about said high-reluctance yoke portion of said core for inducing, in response to an overload in the high-tension line, in at least that part of said magnetic circuit which includes said pole portions of said core and said armature a counter magnetic flux opposite to that induced by said coil means; and second counter-coil means wound about said armature for inducing therein, in response to backfiring in the high-tension line, a magnetic counter flux which is also opposite to that induced by said coil means, said second counter-coil means responding to the backfiring more quickly than said first counter-coil means, whereby said magnetic counter flux is induced by said second counter-coil means at the place where said armature contacts both of said pole portions of said core, thereby avoiding stray losses.

4. An electroresponsive circuit breaking device, for use as a high-speed circuit breaker in a high power tension line, comprising, in combination, a holding system comprising an electromagnet producing a holding flux, a yoke, a tripping coil on said yoke, an armature being held in attracted position during normal closed position of said circuit breaking device, means urging said armature out of contact in the case of faults in said line, and a counter flux coil disposed on said armature adapted for producing a magnetic counter flux opposed to said holding flux, and extraneous means for generating pulses energizing said counter flux coil, whenever a fault occurs in said line, and prior to the response of said tripping coil thereto, said extraneous means comprises a highspeed return current relay adapted for simultaneously interrupting energization of said holding electromagnet and generating a pulse energizing said counter flux coil.

References Cited in the file of this patent

UNITED STATES PATENTS

| 1,427,367 | Fortescue et al. | Aug. 29, 1922 |
| 1,427,369 | Fortescue | Aug. 29, 1922 |
| 1,873,087 | Wensley | Aug. 23, 1932 |
| 2,130,871 | Boehne | Sept. 20, 1938 |
| 2,740,934 | Kesselring | Apr. 13, 1956 |